United States Patent [19]

Azarevich et al.

[11] 4,393,675
[45] Jul. 19, 1983

[54] CONTRIVANCE FOR THE MACHINING OF CYLINDRICAL SURFACES ON METAL-CUTTING LATHES

[76] Inventors: Gennady M. Azarevich, ulitsa Akademika Yangelya, 14, korpus 2, kv. 257; Iosif A. Gusyatsky, ulitsa Malaya Bronnaya, 10, kv. 35; Lidia B. Savelieva, 9 Parkovaya ulitsa, 68, korpus 2, kv. 16; Boris I. Akimov, Simonovsky val, 7, korpus 1, kv. 249, all of Moscow, U.S.S.R.

[21] Appl. No.: 242,521

[22] Filed: Mar. 11, 1981

[30] Foreign Application Priority Data

Apr. 25, 1980 [SU] U.S.S.R. .............................. 2916251

[51] Int. Cl.$^3$ .................... B23B 27/10; B24B 39/04
[52] U.S. Cl. ........................................ 72/71; 72/44; 72/45; 29/90 R; 82/25; 82/DIG. 2; 408/60
[58] Field of Search ............... 72/71, 84, 275, 45, 72/70, 41, 43, 44; 29/90 R, 27 R, 27 C; 82/20, 25, 45, 50, 52, DIG. 2; 10/106; 408/57, 60, 61

[56] References Cited

U.S. PATENT DOCUMENTS

| | | | |
|---|---|---|---|
| 1,045,885 | 12/1912 | Ray | 408/60 |
| 1,164,593 | 12/1915 | Bosler et al. | 82/20 |
| 1,896,674 | 2/1933 | Longwell | 72/41 |
| 2,186,770 | 1/1940 | Schurr | 10/106 |
| 2,232,304 | 2/1941 | Baker | 82/25 |
| 2,709,822 | 6/1955 | Marsden | 408/60 |
| 3,157,093 | 11/1964 | Shaw | 72/275 |
| 3,176,330 | 4/1965 | Jennings | 408/57 |
| 3,367,220 | 2/1968 | Copeland | 82/20 |
| 3,973,319 | 8/1976 | Klose | 72/71 |
| 4,184,794 | 1/1980 | Henninghaus | 29/90 R |

FOREIGN PATENT DOCUMENTS 305982 11/1971 U.S.S.R. .............................. 72/71

Primary Examiner—Lowell A. Larson
Attorney, Agent, or Firm—Fleit, Jacobson & Cohn

[57] ABSTRACT

A contrivance for the machining of cylindrical surfaces on metal-cutting lathes in a housing whereof there are contained a tool head with at least one tool, a head with deforming rollers, and a system for feeding coolant-lubricant to the tool and deforming rollers. The system for feeding coolant-lubricant incorporates a chamber which is located inside the housing between the tool head and the head with deforming rollers, communicates with a source of coolant-lubricant, and is also connected to the tool head with deforming rollers through at least one nozzle arranged so that the jet issuing therefrom is aimed at the cutting edge of the tool.

2 Claims, 1 Drawing Figure

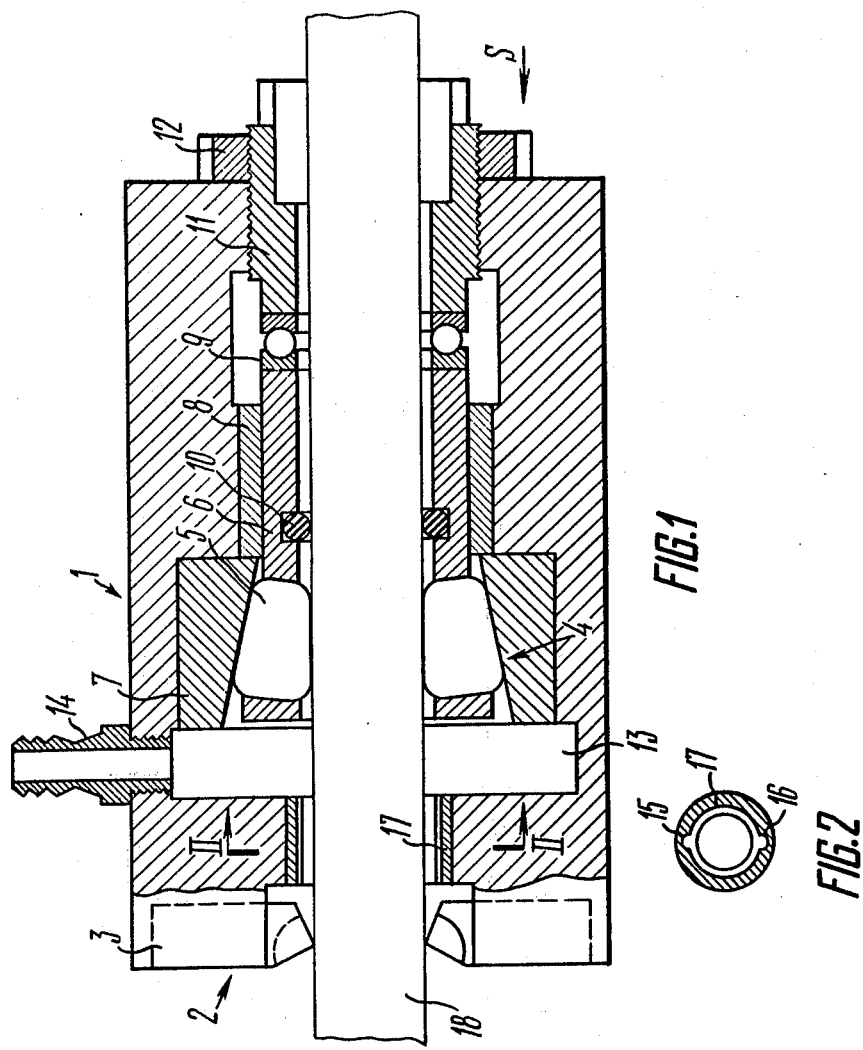

CONTRIVANCE FOR THE MACHINING OF CYLINDRICAL SURFACES ON METAL-CUTTING LATHES

The present invention relates to tools for the machining of metals by turning and superficial plastic deformation and has a special reference to contrivances for the machining of cylindrical surfaces.

The invention is intended for use on lathes for the turning of shafts, piston rods of hydraulic cylinders, axles, and other similar products.

Lathes equipped with the contrivance for the machining of cylindrical surfaces may find application in the automotive, tractor and agricultural machinery industries, road machine building, and elsewhere.

There is known a contrivance for the machining of outside cylindrical surfaces on metal-cutting lathes incorporating a housing contained wherein are a tool head, a head with deforming rollers, and a system for feeding coolant-lubricant to the tool and deforming rollers. The system for feeding coolant-lubricant incorporates tubing connected to a union at one end, and the union communicates with a source of coolant-lubricant.

One of the tubes is given the shape of a hollow torus with openings for feeding coolant-lubricant to the work. Another tube feeds coolant-lubricant to the tool and a further tube delivers coolant-lubricant to the head with deforming rollers.

In any contrivance for the simultaneous machining by turning and superficial plastic deformation the flow of coolant-lubricant must be directed into the cutting zone to ensure adequate cooling of the tool and removing the chip from the machining zone or otherwise it may come under the deforming rollers. Yet, in the contrivance described above the coolant-lubricant is fed inefficiently, failing to dispose of the chip in the prescribed direction so that, as a result, it interferes with the operation of the deforming rollers. Moreover, the method of distributing the coolant-lubricant employed therein fails to ensure effective cooling of the tools when in use as a tool head with two tools.

It is an object of the present invention to attain effective cooling of the tools.

Another object of the invention is to ensure a directional disposing of the chip from the cutting zone in a reliable way.

A further object of the invention is to improve the quality of machining.

In accordance with said and other objects disclosed herein is a contrivance for the machining of cylindrical surfaces on metal-cutting lathes in a housing whereof there are contained a tool head with at least one tool, a head with deforming rollers, and a system for feeding coolant-lubricant to the tool and deforming rollers, said system being provided, according to the invention, with a chamber located inside the housing between the tool head and the head with deforming rollers, communicating with a source of coolant-lubricant, and connected to the head with deforming rollers and the tool head through at least one nozzle arranged so that the jet issuing therefrom is aimed at the cutting edge of the tool.

It is expedient, if use is made of a tool head equipped with two oppositely-arranged tools, to provide the nozzles in the form of half cylinders axially disposed in a cylindrical sleeve fitted in the housing between the chamber and the tool head.

Nozzles of the above layout, simple as they are, ensure effective cooling of both tools and fully eliminate the possibility of sidetracking the chip under the deforming rollers.

The contrivance for the machining of cylindrical surfaces on metal-cutting lathes provided in accordance with the present invention is conducive to improving the durability of tools and the quality of machining.

A preferred embodiment of the present invention is described hereinafter with reference to the accompanying drawings in which:

FIG. 1 is a schematic sectional view in plan of a contrivance for the machining of cylindrical surfaces according to the invention;

FIG. 2 is a section on line II—II in FIG. 1 on a reduced scale.

A contrivance for the machining of cylindrical surfaces on metal-cutting lathes incorporates a housing 1 located wherein consecutively in the direction opposite to axial feed indicated by arrows S there are a tool head 2 with oppositely arranged tools 3 and a head 4 with deforming rollers 5. Contained in the head 4 is a cage 6 with slots accommodating the deforming rollers 5 which are spaced equidistantly apart all the way along the circumference and rest on a supporting cone 7 located inside the housing 1. The cage 6 rotates in a bronze bushing 8 and is supported by a bearing 9. A sealing ring 10 is fitted into a circular groove of the cage 6. The rollers 5 are set at a given turning diameter by means of an adjusting nut 11 meshing a female thread in the housing 1. Nut 12 serves to fix the cage 6 after the adjustment.

The system for feeding coolant-lubricant incorporates a chamber 13 located inside the housing 1 between the tool head 2 and the head 4. A union 14 connects the chamber 13 to a source of coolant-lubricant (not shown). The chamber 13 communicates with the head 4 carrying the deforming rollers 5 and is also connected to the tool head 2 by way of nozzles 15 (FIG. 2) and 16 provided in a cylindrical sleeve 17.

The sleeve 17, fitted inside the housing 1 between the chamber 13 and the tool head 2, has a bore of a diameter enabling the work 18 to pass therethrough. Each of the nozzles 15 and 16 represents a half cylinder extending axially in the cylindrical sleeve 17 so that the jet issuing therefrom strikes the cutting edge of the corresponding tool 3.

The contrivance for the machining of cylindrical surfaces on metal-cutting lathes operates on the following lines.

The contrivance is fitted to the carriage of a lathe in a position ready for turning, and the work 18 is clamped between the centres (not shown). On setting the work to rotate and turning on the delivery of a coolant-lubricant, the axial feed of the carriage is engaged. The coolant-lubricant pressure-fed through the union 14 enters the chamber 13. A part of the coolant-lubricant contained in the chamber 13 is applied to the deforming rollers 5, the sealing ring 10 checking its outflow in the direction opposite to that of the axial feed indicated by arrow S. Another part is fed, by way of the nozzles 15 and 16 located in the cylindrical sleeve 17, to the cutting edges of the tools 3 to remove the chip from the cutting zone. A clearance of minimum size existing between the cylindrical sleeve 17 and the work 18 enables the coolant-lubricant to reach the work. The flow induced in the clearance carries along the fragments of the products of turning entering the clearance, eliminating the possibility of their coming under the deforming rollers 5. The tools 3, always staying in a zone of effective cooling created by virtue of the directional feed of the coolant-lubricant to their cutting edges by means of the nozzles 15 and 16, display a durability better than ever before. This cuts the time required for the changing and setting of tools and, consequently, improves labour productivity by 20 to 50 percent compared with the known contrivance.

What is claimed is:

1. A contrivance for the machining of cylindrical surfaces on work supported for rotation on metal-cutting lathes comprising a housing; a tool head fixed inside said housing; at least one tool clamped in said tool head and having a cutting edge; a head with deforming rollers, said head being located in said housing behind said tool head; a system for feeding coolant-lubricant incorporating a source of coolant-lubricant, a chamber disposed in said housing between said tool head and said head with deforming rollers, said chamber being connected to said source of coolant-lubricant and to said head with deforming rollers, at least one nozzle fitted in said housing between said chamber and said tool head so that the jet issuing therefrom is aimed at the cutting edge of at least one said tool, the surface of said work defining one wall of said nozzle, and said nozzle confining the coolant-lubricant flow to direct and confine said flow to issue agaínt the cutting edge of said tool.

2. A contrivance as claimed in claim 1, wherein, if use is made of the tool head with two oppositely-arranged tools, the nozzles are provided in the form of half cylinders axially disposed in a cylindrical sleeve fitted in the housing between the chamber and the tool head.

* * * * *